Dec. 28, 1954 L. L. SEVEBECK 2,698,212

CARD SEPARATING AND POSITION MARKING DEVICE FOR CARD FILE SYSTEMS

Filed Feb. 26, 1953 2 Sheets-Sheet 1

INVENTOR
L.L. SEVEBECK

BY W. C. Parnell
ATTORNEY

Dec. 28, 1954 | L. L. SEVEBECK | 2,698,212

CARD SEPARATING AND POSITION MARKING DEVICE FOR CARD FILE SYSTEMS

Filed Feb. 26, 1953 | 2 Sheets-Sheet 2

INVENTOR
L.L. SEVEBECK
BY W C Parnell
ATTORNEY

1

2,698,212

CARD SEPARATING AND POSITION MARKING DEVICE FOR CARD FILE SYSTEMS

Laurin L. Sevebeck, Mountainside, N. J., assignor to Western Electric Company, Incorporated, New York, N. Y., a corporation of New York Application February 26, 1953, Serial No. 338,951

2 Claims. (Cl. 312—186)

This invention relates to card file systems and particularly to a method of, and apparatus for, separating the cards filed therein and marking the position in the file of a card withdrawn therefrom.

Heretofore, the separation of cards filed in card file systems, for visually inspecting the information contained on the top side thereof, has been accomplished in various ways. For example, in rotary file systems permanent magnets were utilized for inducing magnetic flux in steel shims contained in the sides of cards filed therein. The card separation resulted from the repelling magnetic forces established between the cards due to like poles being induced in corresponding parts of each of the shim inserts. While such a system performs the separating function satisfactorily, it does not provide any simple position marking for cards withdrawn from the file. Since cards are often removed from the file for one purpose or another, refiling could be facilitated and considerable time saved by the operator if the position of the card in the file was marked or made accessible.

It is, therefore, the principal object of this invention to provide a method and apparatus for separating the cards of a card file system and to mark, in the file, the position of a card withdrawn therefrom, thereby facilitating its refiling.

In accordance with the present invention, a magnetic field is established in the proximity of the filed cards. These cards are provided with magnetic material inserts along their sides so that they are separated magnetically. The desired card is then selected from the separated cards and the magnetic field is removed or collapsed while the card is being withdrawn from the file thereby permitting a V separation to be left between the cards at the location where the card was removed.

In a preferred embodiment of the present invention adapted to a rotary file system, electromagnets are positioned along the two sides of the top opening of the file and a switch is provided for connecting an energizing source to the magnets.

Other objects and features of the invention will be more readily understood from the following detailed description taken in conjunction with the attached drawing in which.

Figure 1:
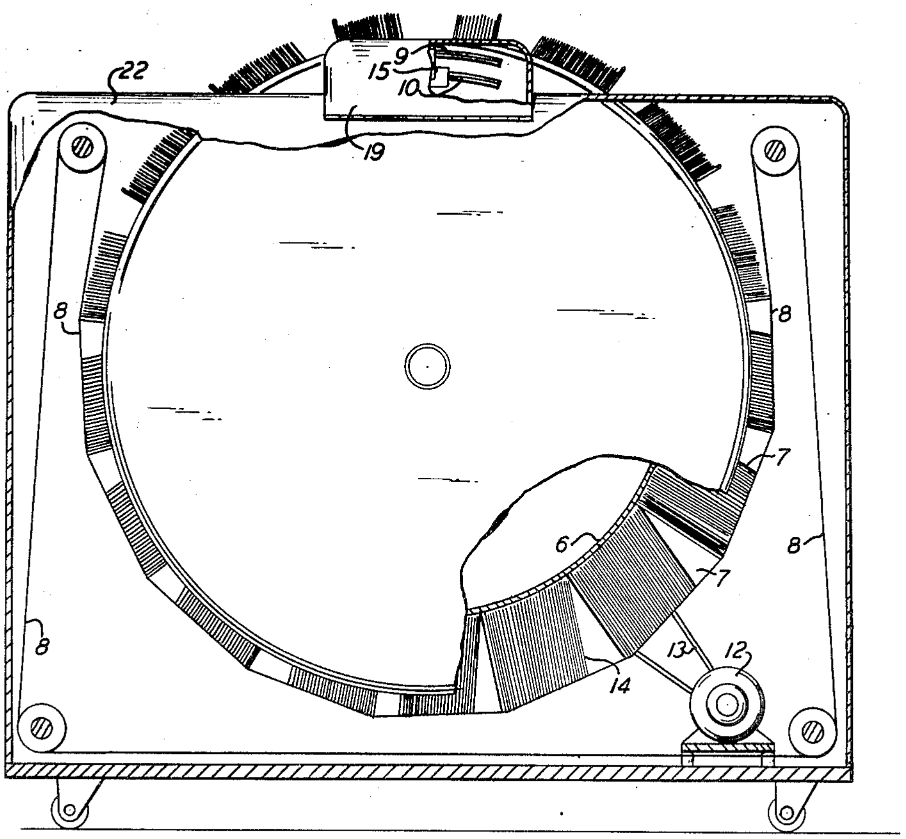
Fig. 1 is a side view of a rotary file system in which the invention is utilized.
Figure 2:
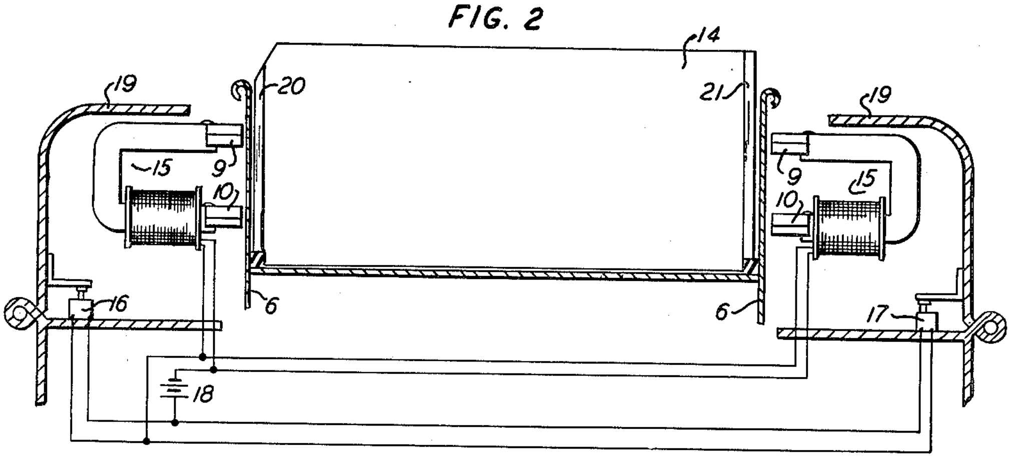
Fig. 2 is a partial side view of the device of Fig. 1 and includes a circuit diagram therefor.
Figure 3:
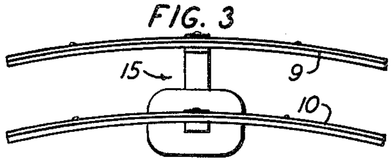
Fig. 3 is a detailed side view of one of the electromagnets utilized in the device of Fig. 1.

Referring now to the drawing, in Fig. 1 is shown a rotary file system having a housing 22 provided with a card access opening in its top and having a large nonmagnetic wheel 6 rotatably mounted therein. Wheel 6 is provided with a plurality of radially separated card receiving compartments 7 around its periphery. The cards 14 are prevented from falling out of the compartments when the compartments face downwardly by means of an endless belt 8. A motor 12 is provided for rotating the wheel 6 by means of a belt 13. An electromagnet 15, as seen in Fig. 2, is provided along each side of the top opening of the housing 22 in close proximity to the card receiving compartments. These magnets have arcuate pole pieces 9 and 10 to cover substantially the extent of one compartment. Fig. 3 is a side view of one

2 of the magnets showing the pole pieces 9 and 10 in detail. The magnets 15 are energized by the operation of microswitch 16 or 17, switch 16 being located on one side of the file opening and switch 17 being located on the other side. As the switches are connected in parallel, operation of either switch 16 or 17 connects an energizing source 18 across the parallel connected electromagnet windings. Switches 16 and 17 are operated by applying pressure on the spring loaded hinged lids 19 covering the electromagnets. These hinged lids are located along the sides of the file opening so that the operator may conveniently actuate the electromagnets from either side of the file. As a result of this movable lid switching arrangement, the invention may be utilized by the operator without any additional motions or physical operations on his part since in selecting a card for withdrawal, his arm or hand is normally on one of the lids along the side of the file adjacent the cards, thereby actuating one of the energizing switches, and on removing the card from the file, his arm or hand is automatically removed therefrom thereby releasing the switch.

Figure 4:
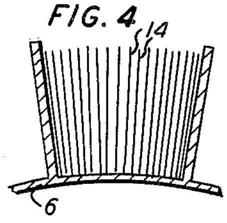
Figs. 4 and 5 show the conditions of the cards of the file for operated and non-operated conditions, respectively, of the electromagnets.
Figure 5:
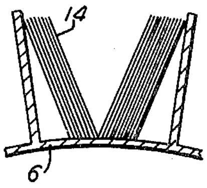

The cards 14 are provided with steel shim inserts in their ends 20 and 21 (Fig. 2) such that when the electromagnets 15 are energized, the cards will be separated magnetically as seen in Fig. 4 whereby the information at the top of the cards is readily available to the operator. Then simply by relieving his arm pressure on the actuated lid 19 before completely removing a selected card from the file, the electromagnets will be de-energized and, as seen in Fig. 5, a separation will be left between the cards at the location where the card was removed.

While the invention has been described with respect to a particular embodiment for purposes of illustration, it is to be understood that the device could be modified in various ways in accordance with the general principles of the invention and the requirements of the particular conditions of use. For example, instead of providing two lid operated switches, a single foot operated switch may be utilized or the electromagnets may be serially connected and the energizing source could be connected across this series arrangement through the switch. These and numerous other arrangements may be devised by those skilled in the art which will embody the principles of the invention and fall within the spirit and score thereof.

What is claimed is:

1. The combination with a rotary file for cards having magnetic material inserts in their sides and a position marking and card separating device therefor, said file comprising a housing having a card access opening in its top side and a wheel having a plurality of card receiving compartments around its periphery rotatably mounted in the housing whereby the compartments of the wheel pass through the top opening in the housing, said card separating and position marking device comprising an electromagnet positioned on each side of the said opening, a source of power for the electromagnets and a circuit for connecting the source to the electromagnets, of a combination operator's hand rest and movable protective cover for at least one of the electromagnets mounted on the housing, resilient means for holding the cover in a normal position, a normally open switch connected in the circuit and means subject to the operator's hand pressure on the rest for closing the switch to connect the source to the electromagnets.

2. The combination with a rotary file for cards having magnetic material inserts in their sides and a position marking and card separating device therefor, said file comprising a housing having a card access opening in its top side and a wheel having a plurality of card receiving compartments around its periphery rotatably mounted in the housing whereby the compartments of the wheel pass through the top opening in the housing, said card separating and position marking device comprising an electromagnet positioned on each side of the said opening, a source of power for the electromagnets and a circuit for connecting the source to the electromagnets, of a combination operator's hand rest and movable protective cover for each electromagnet mounted on the housing, resilient means for holding the covers in normal positions, a normally open switch for each cover connected in the circuit and actuators for the switches mounted on the covers for connecting the source to the electromagnets when either cover is moved to an operated position by the operator's hand pressure to actuate its switch.

References Cited in the file of this patent

UNITED STATES PATENTS

| Number | Name | Date |
| --- | --- | --- |
| 2,002,807 | Whitson | May 28, 1935 |
| 2,341,639 | Mathiesen | Feb. 15, 1944 |
| 2,343,280 | Cory | Mar. 7, 1944 |
| 2,418,357 | Knittel | Apr. 1, 1947 |
| 2,474,141 | Chatterton | June 21, 1949 |
| 2,495,490 | Whitson | Jan. 24, 1950 |
| 2,656,091 | Mathiesen | Oct. 20, 1953 |